July 1, 1969   H. W. WEXELL   3,452,793
METHOD IN SAWING LOGS INTO BOARDS, PLANKS AND SLEEPERS
Filed Nov. 14, 1966   Sheet 1 of 2

INVENTOR
HARRY WILHELM WEXELL

BY *Wenderoth, Lind & Ponack*
ATTORNEYS

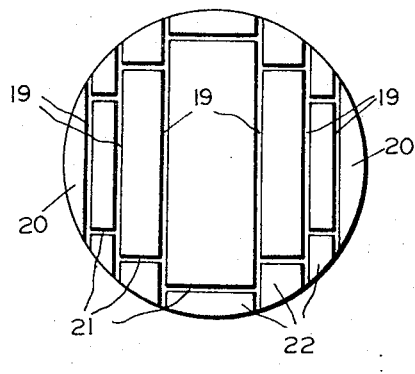
FIG.8
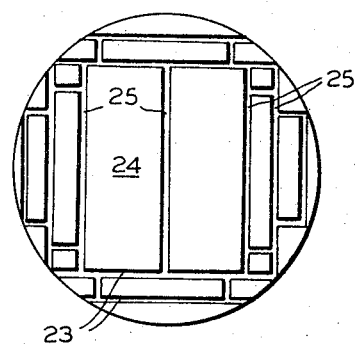
FIG.9
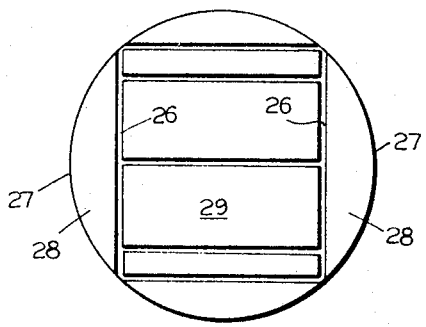
FIG.10
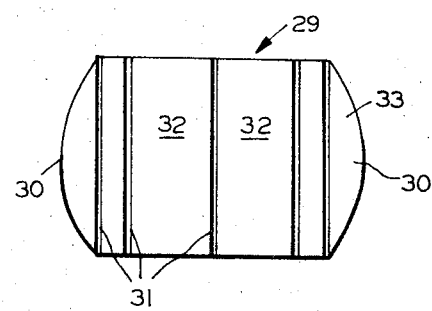
FIG.11
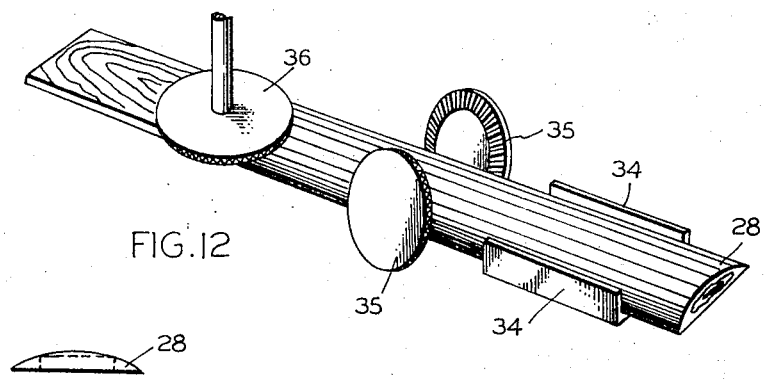
FIG.12
FIG.13

United States Patent Office 3,452,793
Patented July 1, 1969

3,452,793
METHOD IN SAWING LOGS INTO BOARDS, PLANKS AND SLEEPERS
Harry Wilhelm Wexell, Gavle, Sweden, assignor to Brundell Och Jonsson AB, Gavle, Sweden, a Swedish corporation
Filed Nov. 14, 1966, Ser. No. 594,233
Claims priority, application Sweden, Dec. 17, 1965, 16,368/65
Int. Cl. B27b 1/00
U.S. Cl. 144—312       3 Claims

ABSTRACT OF THE DISCLOSURE

A method of producing lumber from a debarked tapered log wherein the thickest end of the log is chipped to obtain a cylindrical surface concentric with the longitudinal axis of the log. The log is then guided into a sawing machine and then sawed into relatively thick slabs. The thick slabs are milled into boards using as guides the parallel slab border portions derived from the cylindrical log surface.

---

Figure 1:
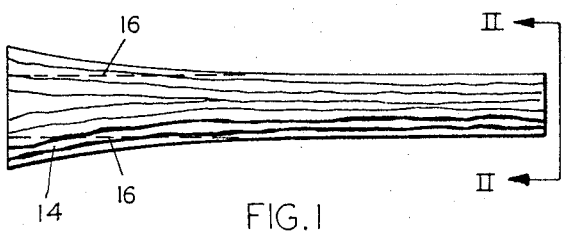

The invention relates to a method in sawing logs into boards, planks and sleepers.

In sawing lumber into planks, boards, etc., a great deal of manual work has hitherto been required. Particularly, the lining up of the logs when feeding them onto ripping saws, frame saws, etc., has been tedious. It is true that there are various mechanical and optical auxiliary means (guide lights and the like) for facilitating the guidance, but because of the irregular shape of the logs an entirely automatic feed has not been considered feasible, and therefore the guiding is still controlled manually. The circumstances are similar regarding the feeding of the irregularly shaped boards to the edging machines.

The invention teaches a method by which the manual work in sawing logs (preferably debarked) into boards, planks and possibly sleepers is considerably reduced. Further, it becomes possible to reduce the amount of low-grade saw dust formed and to gain, instead, a quantity of high-grade chips suitable for cooking pulp. According to the new method, a least the thicker end portion (the butt end) of the log is given a cylindrical surface concentric to the longitudinal axis of the log by means of turning or milling, whereby chips useful for cooking of pulp are formed as a by-product, and said cylindrical surface is then utilized for guiding when the log and longitudinal segments thereof are fed axially onto a sawing machine.

Owing to the original shape of the log the cylindrical surface may extend along a longer or shorter log portion, and preferably it should be dimensioned such that the yield of the most valuable wood products will be as good as possible. Turning may be carried out in a lathe, and a cylindrical surface may also be provided by milling a log rotating around its longitudinal axis. However, the simplest procedure would be to use a chipping machine comprising an open-ended conical rotor internally provided with chipping tools. Such a rotor may be made adjustable with regard to different log diameters, and thus a log fed through the rotor can have its circumference reduced in such a way that a cylindrical portion is given a desired length.

The cylindrical surface of the log may be guided axially by simple automatically operating guide means of known construction, such as are used in the metal industry for guiding cylindrical tubes or rods, for instance. The same guide means are also useful in advancing the unedged boards to edging machines in that the inclined borders of the boards extend in parallel within the zone derived from the cylindrical part of the log. It should be noted that it is often sufficient for satisfactory guidance, if a minor portion of the log is made cylindrical from the butt end, as the sawing machine contributes to the continued guidance as soon as the saws engage the foremost top end of the log.

According to a particularly convenient embodiment of the invention the sawing is carried out such that the slabs become sufficiently thick to render possible a production of one board from each slab by face milling and edge milling. Also the other unedged boards are preferably trimmed by edge milling, so that valuable chips are obtained instead of sawdust otherwise formed.

Figure 2:
Figure 3:
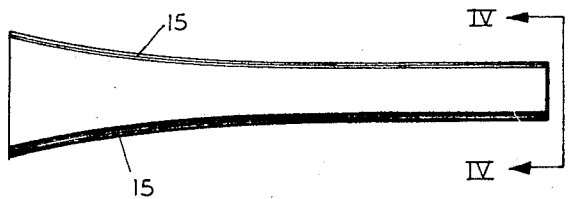
Figure 4:
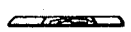
Figure 5:
Figure 6:
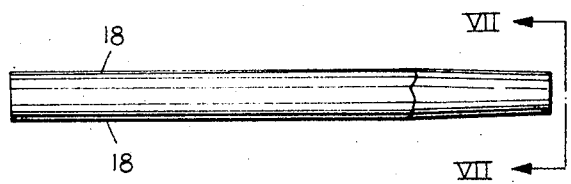
Figure 7:

The method according to the invention will be described in more detail with reference to the accompanying drawings, in which:

FIGURES 1 and 2 show a side view and a top end view, respectively, of a debarked log;
FIGURES 3 and 4 show an unedged board sawn according to the conventional methods and seen from the side and from the narrow end, respectively;
FIGURE 5 shows a log partly turned down;
FIGURES 6 and 7 show a slab sawn from the log in FIG. 5 and seen from above and from the narrow end, respectively;
FIGURES 8 and 9 show the disposition of the saw cuts in the cross section of the log according to two known methods, i.e., "through-sawing" in FIG. 8 and "square sawing" in FIG. 9;
FIGURE 10 shows a convenient disposition of cuts in carrying out the method according to the invention;
FIGURE 11 shows a cross section of a partly sawn log or sleeper emerging from an edge frame saw in sawing according to the invention;
FIGURE 12 shows diagrammatically and in perspective the milling of a log segment into a board, and
FIGURE 13 shows a cross section through such a log segment.

The log shown in FIG. 1 has a bulge 14 at the butt end, which renders impossible a mechanical guidance during the feeding. A board sawn directly from this log will have the shape shown in FIG. 3, i.e., the edge portions 15 of the board diverge towards the rear end and therefore they cannot be used for guiding purposes during a subsequent edging process.

According to the invention, those portions of the butt end of the log which are outside the broken lines 16 in FIG. 1 are removed by turning or milling so that the rear portion of the log gets a cylindrical shape. The turning or milling results in valuable chips as by-product, and preferably a chipping rotor, a so-called reducer, is used for this operation. The reduction should be carried out such that the cylindrical surface becomes substantially coaxial to the longitudinal axis of the log and thus will be able to guide the log axially. The log shown in FIG. 5 is turned down to cylindrical shape (at 17) along the greater part of its length, although such a long cylindrical portion is mostly not necessary. FIGS. 6 and 7 show a log segment which is dimensioned so thick that a board can be cut from it. In correspondence to the cylindrical log portion 17 this log segment has two longitudinal parallel borders 18 which render possible a rectilinear guidance of the segment during a subsequent edge trimming and possibly a face milling.

The known patterns of cuts shown in FIGS. 8 and 9 are intended to be compared with the invention. In FIG. 8 the log is diveded by six vertical cuts 19 (through-sawing) into seven segments, of which the two outer ones are slabs 20. The five intermediate segments are then edged separately by horizontal cuts 21, so that edge battens 22 are formed. Square sawing according to the pattern shown in FIG. 9 means that the log is first guided through a frame saw which makes four vertical cuts, for instance (the horizontal cuts 23 in FIG. 9), whereby the log is divided into a sleeper-like core 24, two adjacent thinner segments and two slabs. The core 24 is turned through 90° and guided through a subsequent resaw which makes the six vertical cuts 25 in FIG. 9. The boards having bevel edges and the segments removed in the frame saw are forwarded to an edger.

In the shown embodiment of the new method, it may be sufficient to perform two vertical cuts 26 by means of an edger. During the advancement the log is guided by means of surface portions 27 located close to the two vertical tangent planes of the cylindrical log portion. At the sawing, the log is divided into two outer segments 28 and an intermediate sleeper-shaped core 29 which in FIG. 11 is shown turned through 90°, i.e., in position to be fed through a resaw. During this feed, the core 29 is guided by means of the arcuate surface portions 30 remaining from the original cylinder, and the resaw performs five cuts 31 which give four edged planks or boards 32 and two rather thick slabs 33. A comparison between FIG. 10 and FIGS. 8, 9 clearly shows that the cuts made according to the invention are considerably fewer and thus lead to a correspondingly reduced production of saw dust. As an example it may be mentioned that for certain lumber dimensions the amount of saw dust may be reduced from 14% in conventional sawing to 9% in sawing according to according to the invention.

The outer segments 28 in FIG. 10 and also the slabs may be trimmed to boards by face milling and edge milling along the broken lines in FIG. 13. Also in this case chips are obtained instead of saw dust. The device shown diagrammatically in FIG. 12 indicates how such a trimming may be carried out. A driven conveyor not shown, feeds the segment 28 between two adjustable guide rules 34 engaging the longitudinal parallel edges of the segment. Two edge milling tools 35 are mounted each to mill one edge portion, and a face milling tool 36 engages the arcuate top surface of the segment 28 to form one side surface of the board.

Of course, the method is not limited to the embodiment described above as an example. Thus, the number of sawn cuts becomes dependent, inter alia, on the thickness of the logs and the desired dimensions of planks and boards, but as a general rule it may be said that in every case the amount of saw dust is reduced in comparison with known sawing methods.

I claim:
1. A method of producing lumber from a debarked tapered log comprising the steps of:
   (a) chipping into usable chips the thickest end of the log to obtain a cylindrical surface concentric with the longitudinal axis of the log,
   (b) guiding the log into a sawing machine using said cylindrical surface and
   (c) sawing relatively thick slabs from the log.
2. A method as claimed in claim 1 including the step of face milling the thick slabs into boards while using as guides the parallel slab border portions derived from the cylindrical log surface.
3. A method as claimed in claim 2 wherein the inclined borders of said boards are squared by milling while using as guides the parallel border portions derived from the cylindrical log surface.

References Cited
UNITED STATES PATENTS

| | | | |
|---|---|---|---|
| 1,606,313 | 11/1926 | Martenet | 144—4 X |
| 1,747,123 | 2/1930 | Morris | 144—3 |
| 1,825,041 | 9/1931 | Babrre | 144—39 |
| 1,842,419 | 1/1932 | Morris | 144—3 |

DONALD R. SCHRAN, *Primary Examiner.*